United States Patent Office 3,523,103
Patented Aug. 4, 1970

3,523,103
PROCESS FOR POLYURETHANE FORMATION AND CATALYSTS THEREFOR
John C. Zemlin, Reading, Mass., assignor to Liner Technology Inc., Burlington, Mass., a corporation of Massachusetts
No Drawing. Filed June 8, 1965, Ser. No. 462,438
Int. Cl. C08g 22/42
U.S. Cl. 260—75
2 Claims

ABSTRACT OF THE DISCLOSURE

A process of making a cured polymer such as polyurethane by forming a mixture of a polyisocyanate and an active hydrogen-containing compound, e.g., a polyol, which is reactive therewith on curing, which comprises incorporating into said mixture a latent catalyst which is ineffective to cure said mixture at room temperature, the latent catalyst being an organotin compound, and then heating said curable mixture to a temperature of at least 100° C. to activate said catalyst and cure said mixture.

---

This invention relates to the catalytic formation or curing of polyurethanes and to novel curable polyurethane-forming compositions containing latent organotin catalysts.

The excellent physical properties of polyurethane plastics are well known. It is also well known to prepare nonporous molded polymeric plastics having

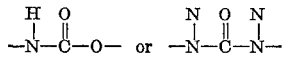

groups in the polymer chain (such as polyurethanes and polyureas) by premixing a polyfunctional alcohol or amine and a polyisocyanate, with or without catalyst, casting or otherwise shaping the mixture and then curing the mixture, frequently with heat and pressure. The resulting cured plastic is most commonly a cross-linked elastomer. Attempts have been made to prepare such elastomers in production line operations, but these efforts were usually unsuccessful. When the reaction compositions were so compounded as to give a long enough work or pot life to permit normal handling, the curing time was too long. On the other hand, when the catalyst used was such as to give short curing times, the work life of the mixture was so short as to make normal handling impractical.

It is therefore an object of this invention to provide a new castable polyurethane-forming composition which has a reasonably long work life after its components have been mixed and which may yet be rapidly cured after casting.

Another object of this invention is the provision of a catalyst-containing composition which is stable enough to be readily handled, worked and shaped at room temperature but which may be cured quickly.

Still another object of this invention is the provision of a new process suitable for the manufacture of polyurethane plastics on high speed production lines.

Other objects of this invention will be apparent from the following detailed description and claims. In this description and claims all proportions are by weight unless otherwise indicated.

In accordance with one aspect of this invention, there is incorporated in the polyurethane-forming composition an organotin compound which acts as a latent heat-activable catalyst. The resulting mixture has a long work life and may be kept in its unreacted state at room temperature for at least one hour, and preferably for at least two hours. It will be understood, however, that the broad aspects of this invention also encompass an improvement in work life, even if it totals less than one hour, when compared to similar systems containing a conventional catalyst. On heating, for example, to a temperature above 100° C., but preferably not above 250° C., e.g., at about 140°–160° C., the catalyst is activated and the reaction proceeds very rapidly, at a much faster rate than in the absence of the latent catalyst.

The organotin compounds used as latent catalysts in the practice of this inveniton are represented by the following structural formula:

wherein R is a hydrocarbon radical such as straight or branched chained alkyl group (e.g., methyl, ethyl, isopropyl, butyl, pentyl, hexyl, heptyl, octyl, lauryl, etc.); an aryl group (e.g., phenyl, tolyl, naphthyl, xenyl, etc.); a cycloalkyl group (e.g. cyclopentyl, cyclohexyl, methyl cyclohexyl, etc.); or an aralkyl group (e.g., benzyl, methylbenzyl, phenylethyl, etc.). The R's may be the same or different, and it is preferred to employ organotin compounds having a total number of carbon atoms within the range of 12 to 72.

Representative compounds include: tetra-n-propyltin, tetra-n-butyltin, diethyldiphenyltin, tetraphenyltin, tetrabenzyltin, tetra-n-lauryltin, diamyl dibenzyltin, dilauryl dicyclohexyltin, tributyl naphthyltin, ethyl trilauryltin, etc.

It is also possible to employ organoditin compounds corresponding to the following structural formula:

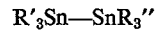

wherein R' and R" are hydrocarbon radicals which are the same as those enumerated above in connection with R, and wherein R' and R" may be the same or different. The preferred organoditin compounds will also have a total carbon atom content within the range of 12 to 108. Illustrative compounds include: hexabenzylditin, hexaethylditin, hexa-n-butylditin, hexaphenylditin, hexastearylditin, hexalaurylditin, trilauryltributylditin, hexaoctaylditin, etc.

The use of tetraorganotin and triorganoditin compounds as urethane catalysts has been suggested before. For example, Hostettler et al. in U.S. Pat, 3,084,177 mention the use of tetra-n-butyltin, tetraoctyltin, tetraphenyltin and related compounds. In practice, however, their catalytic activity has been found to be so low as to preclude their use. Thus, Britain and Gemeinhardt, "Jour. Appl. Polymer Science," IV, II, 207–211 (1960) and tetrabutyltin to be essentially non-catalytic in that at 1% concentration it did not cause a mixture of equal equivalents of toluene diisocyanate and polypropyleneglycoltriol to gel in 240 min. at 70° C. Most commercially useful catalysts, however, had gel times of less than ten minutes in this test.

Hostettler and Cox in "Indust. & Eng. Chem.," vol. 52, No. 7, pp. 609–610 (1960) find tetra-n-butyltin and tetraphenyltin to be very much less active than other metal catalysts in promoting the reaction of phenylisocyanate with butanol, and Gmitter and Braidich in U.S. Pat. 3,148,162, Example IV, show the very slow reaction of a diisocyanate-polyol reaction catalyzed with tetrabenyltin.

These results have been confirmed in that the organotin compounds of this invention are very poor room temperature catalysts. In fact, one of the criteria of the latent catalysts of this invention is that in a polyisocyanate-polyol mixture, gelation will not be produced for sufficient time to permit working of the mixture. Usually this means a "pot life" of at least ½ hour and preferably several hours. It should be understood, however, that some polyol-diisocyanates are a great deal more reactive than others. Thus, other things being equal, a primary hydroxyl group will react with an isocyanate group much faster than a secondary hydroxyl group; and a catalyzed mixture of polyphenylene isocyanate and diethylene glycol (primary hydroxyl) will have a shorter pot life than an identical mixture in which dipropylene glycol (secondary hydroxyl) is substituted for the diethyleneglycol. Isocyanateamine reactions are still faster and, in fact, only with hindered or inactive amines is the use of a catalyst of any value. At best the catalysts of this invention will not shorten the uncatalyzed work life of the mixture.

Despite the low activity of these organotin compounds at normal temperature, it has now been discovered that on heating they become very active catalysts. The temperature at which the organotin compounds become active will vary somewhat, but in general the activating temperature will range from about 100° C. to 250° C., and the preferred activation temperature range is from about 130° to 170° C.

In preparing the compositions of this invention any organic polyisocyanate may be used; for example, 2,4- and 2,6-tolylene diisocyanate, 4,4'-diphenylmethane diisocyanate, 1,4-phenylene diisocyanate, 1,4-cyclohexanediisocyanate, 4,4'-diphenyldimethylmethanediisocyanate, hexamethylenediisocyanate, dianisidenediisocyanate and the like.

Often it is preferred to prepare a prepolymer by reacting a molar excess of one or more of the above isocyanates with a polyol to form a higher molecular weight and less volatile polyisocyanate, which can then be further reacted with additional polyol, or other active hydrogen-containing compound, to form the final product.

As a source of active hydrogen compounds for reaction with the polyisocyanates, polyether polyols or polyalkylene ether glycols are usually preferred owing to their lower cost. Alternatively, however, hydroxyl terminated polyesters can be used, as can di- or polyamines, a wide variety of diols and triols, and, in fact, any molecule which has at least two active hydrogens as determined by the Zerewitinoff method.

As illustrative examples of suitable diols are ethylene glycol, propylene glycol, butylene glycol-2,3, butylene glycol-1,3, 2-methyl pentanediol-2,4, 2-ethylhexanediol-1,3, hexamethylene glycol, decamethylene glycol, styrene glycol, N-phenyl diethanolamine, polyglycols (ether glycols) such as diethylene glycol, triethylene glycol, tetraethylene glycol, polyethylene glycols such as those of average molecular weights of 200, 400, 600 and up to 4000 and higher, dipropylene glycol, tripropylene glycol, and polypropylene glycols such as those of average molecular weights of 400, 750, 1200, 2000 and up to 4000 and higher. Other diols which may be used are monoethers of trihydroxy compounds such as glyceryl-alpha-allyl ether, glyceryl-alpha-phenyl ether, glycerylalpha-isopropyl ether, hydroxy esters such as esters (including polyesters) prepared from 1 mol of dibasic acid (such as adipic acid or the dimer of linoleic acid) and 2 moles of dihydric alcohol, esters (including polyesters) prepared from hydroxy acids and dihydric alcohols in mol ratio of 0.5–1:1, and esters of 1 mol of trihydroxy compound and 1 mol of a monobasic acid, such as the monoglyceride of oleostearic acid. Dihydric phenols such as catechol, resorcinol and 2,2-bis (4-hydroxyphenyl) propane may also be employed as the diols. Examples of trihydroxy compounds are glycerine, triethanolamine, pyrogallol, phloroglucinol, monoethers of tetrahydroxyl compounds such as the monobutyl ether of pentaerythritol, esters of hydroxy acids and trihydroxy compounds in mol ratio of ⅓–1:1, such as glycerine triricinoleate, monoesters of monobasic acids and tetrahydroxy compounds such as pentaerythritol monooleate. Examples of tetrahydroxy compounds are pentaerythritol and its alkylene oxide condensates as well as esters of 1 mol of dibasic acid (e.g. adipic acid) and 2 mols of trihydroxy-compound (e.g. trimethylolpropane). Arabitol, xylitol, sorbitol, dulcitol and mannitol are examples of suitable pentahydroxy and hexahydroxy compounds. Also useful are polyesters prepared by reacting a lactone with a polyol initiator as for example the reaction product of excess ε-caprolactone with ethylene glycol.

Examples of amines which may be used in the preparation of polyurethanes and polyureas are ethylene diamine, trimethylene diamine, tetramethylene diamine, hexamethylene diamine, octamethylene diamine, decamethylene diamine, dodecamethylene diamine, N,N'-dimethyl decamethylene diamine, N,N'-dibenzyl hexamethylene diamine, cyclohexylene-1,4-diamine, orthophenylene diamine, m-phenylene diamine, p-phenylene diamine, benzidine, naphthalene-1,4-diamine, gamma-gamma' - diamino dibutyl oxide, gamma-gamma'-diamino dibutyl sulfide, diethylene triamine and triethylene tetramine, etc. Most often, however, amines are so reactive with isocyanates that catalysts are not needed. Specific exceptions are "hindered" or inactive amines such as methylene bis(2-chloroaniline), dichlorobenzidine, p,p'-amino-diphenyl sulfone, etc.

The use of various fillers such as carbon black, $TiO_2$, $SiO_2$, $CaCo_3$, etc.; extenders such as vinyl plasticizers, chlorinated hydrocarbons, coal tar pitch, etc.; antioxidants, color stabilizers, such as the organic phosphates; flame proofing agents and other additives well known in the art is contemplated in the compositions of this invention.

The blends of polyisocyanate, polyol, or other active hydrogen-containing material, and latent catalyst are generally syrups or, in some cases, non-viscous liquids. For casting purposes it is desirable, as is well known in the art, to use a blend substantially free of volatile solvents. For coatings which may be applied, for example to wood furniture or metal panels a volatile solvent or diluent for dissolving or dispersing the reactive composition may be employed if desired, and may be evaporated before or during the final cure. In either case the product is nonporous. However, it is also within the broader aspects of this invention to use the reactive compositions containing the latent catalysts in the preparation of polyurethane foams (using suitable foaming agents such as those well known in the art, e.g., water, which reacts with isocyanate groups to yield $CO_2$, or a readily volatile fluorocarbon flowing agent) under conditions in which the foaming mixture is brought to a high enough temperature to activate the latent catalyst. It is also within the broader aspects of this invention to use the reactive compositions, containing the latent catalysts, along with inert fillers and other additives to form a powder and to apply this powder to a heated substrate by the known techniques of coating with fluidized beds. The compositions may also be applied as gels; for example, by knife coating onto a cloth or paper substrate and then heating to obtain a cured coating. Depending on the choice of the known reactive components, as is well understood in the art, the cured products can be thermosetting or thermoplastic, and can range from soft elastomers to hard brittle solids.

The heating of the compositions employed in the practice of this invention may advantageously be effected by baking in a hot air or infrared oven; by dielectric heating; by conduction (as in a steam- or electrically-heated mold or through a heated substrate onto which the composition has been coated); by submerging them in a hot inert fluid, such as a silicone oil; or by other means well known in the art.

The proportion of catalyst may be varied to some extent in accordance with desired curing rate. Small amounts of catalyst, e.g. on the order of 1%, are very effective. Advantageously the proportion of catalyst is in the range of about 0.01 to 5%, preferably in the range of about 0.1 to 2% of the total composition. Frequently amounts below 0.01 to 0.05% will produce no effect, whereas the effect of catalyst concentrations above 0.05% will be largely independent of concentrations. The following examples are given to illustrate this invention further:

EXAMPLE 1

An isocyanate terminated prepolymer was prepared from one mole of a 400 molecular weight triol (TP440— a propylene oxide adduct of trimethylolpropane and 3 mols of Hylene TM, a commercial grade of 80% 2,4- and 20% 2,6-tolylene diisocyanate. The prepolymer had an equivalent weight of 310. To a 31 g. portion was added a mixture of 30 g. of hydroxyl terminated ethyleneglycoladipic acid polyester having a hydroxyl number of 168, 2 g. Santocel C, a finely divided silica, 0.6 g. catalyst and 1 g. TiO$_2$. All ingredients but the prepolymer were first mixed on a laboratory paint mill and then at room temperature added to the prepolymer, which was mixed by hand avoiding the incorporation of air. The final mixture was a thixotropic gel which was coated with a draw down blade to a thickness of 10 mils on kraft paper. The paper was then exposed to a 170° C. air blast for 45 sec. and was subsequently cooled with air with the following results:

| Catalyst | Strike through | Amount of cure | Room temp. pot life of coating |
|---|---|---|---|
| None | Considerable | None | Over 8 hrs. |
| Tetraphenyltin | Slight | Complete | Do. |
| Hexa-n-butylditin | None | do | Do. |
| Tetra-γ-butyltin | do | do | Do. |
| Tetrabenzyltin | do | do | Do. |
| Hexaphenylditin | Very slight | do | Do. |
| Dibutyltindilaurate | Gelled during final mixing. | | 1 minute. |
| Methyldiethanolamine | Moderate | Partial | 20 minutes. |

The last two catalysts, dibutyltindilaurate and methyldiethanolamine, were included as representative of catalysts being used today for curing a polyurethane resins. The limited pot life of the catalyzed compositions resulting from the use of these two catalysts is evident.

EXAMPLE 2

An isocyanate terminated prepolymer was prepared from one mol of a 2500 molecular weight trimethylpropane-initiated triol of polypropyleneglycol (i.e., a reaction product of trimethylolpropane and propylene oxide) and 2.5 mols of Hylene TM, a commercial grade of 80% 2,4- and 20% 2,6-tolylene diisocyanate. The resulting prepolymer had an equivalent weight of 1202 with an available NCO content of 3.5%. A series of compositions were prepared by adding 10.2 g. of this prepolymer to 5.2 g. of a 1000 molecular weight polypropylene glycol diol and 0.15 g. of the below listed catalyst. Each mixture was stirred vigorously and then a 0.15 cc. portion was placed on aluminum plate inclined at 20° from the horizontal and maintained at 150° C. The time for the sample to gel as evidenced by cessation of movement down the plate was measured as follows:

| Catalyst | Time to gelation 150° C. (sec.) | R.T.[1] (hrs.) | Appearance, R.T.[1] hrs.(24) |
|---|---|---|---|
| Tetra-n-propyltin | 17 | 12+ | Viscous liquid. |
| Tetra-n-butyltin | 18 | 12+ | Liquid. |
| Tetra-n-lauryltin | 39 | 12+ | Do. |
| Tetraphenyltin | 48 | 12+ | Do. |
| Tetrabenzyltin | 37 | 12+ | Do. |
| Diethyldiphenyltin | 32 | 12+ | Do. |
| Hexa-n-butylditin | 21 | 12+ | Do. |
| Hexaphenylditin | 26 | 12+ | Do. |
| None | 240+ | 12+ | Do. |
| Dibutyltindilaurate | 4 | ½ | Soft rubber. |

[1] Room temperature.

EXAMPLE 3

An isocyanate terminated prepolymer was prepared from 2 equivalents of a 700 mol. wt. polypropyleneglycol diol, 3 equivalents of a 750 mol. wt. trimethylolpropane initiated polypropyleneglycol triol and 10.5 equivalents of Hylene TM, a commercial grade of 80% 2,4- and 20% 2,6-tolylene diisocyanate. The resulting prepolymer had an equivalent weight of 442 and a free NCO content of 9.5%. A number of catalytic materials were tested with this prepolymer by first mixing 0.10 g. of catalyst in 0.437 g. of trimethylolpropane previously dissolved in 0.45 g. of 1,4-butanediol. 8.82 g. of prepolymer were then added with thorough mixing at room temperature. A 0.15 cc. portion was then placed on an aluminum plate inclined at 20° C. from the horizontal and maintained at 150° C. The time for the sample to gel was evidenced by cessation of movement down the plate was measured as follows:

| Catalyst | Time to gelation 150° C. (sec.) | R.T.[1] (hrs.) |
|---|---|---|
| Tetra-n-butyltin | 18 | 3 |
| Hexa-n-butylditin | 13 | 3 |
| Tetra-n-propyltin | 21 | 3 |
| Tetraphenyltin | 32 | 12+ |
| Diethyldiphenyltin | 15 | 12 |
| Tetrabenzyltin | 12 | 12 |
| Hexaphenylditin | 19 | 12 |
| Tetra-n-lauryltin | 22 | 12+ |
| Dibutyltin dilaurate | 4 | 1/60 |
| None | 180+ | 12+ |

[1] Room temperature.

EXAMPLE 4

A prepolymer was prepared by reacting one mol of a 2000 M.W. diethyleneglycol initiated polyester of E-caprolactone with two mols of p-phenylene diisocyanate. The resulting viscous liquid was mixed at room temperature with 1,4-butane diol at an NCO to OH ratio of 1:2. This mixture was then divided into small equal portions, and to each portion 1% by weight of a catalyst was added. 0.15 cc. of each portion was then placed on an inclined plane, kept at 160° C. and the time for loss of mobility noted.

| Catalyst | Time to gelation 150° C. (sec.) | R.T.[1] (hrs.) | Appearance, R.T.[1] (24 hrs.) |
|---|---|---|---|
| None | 180+ | 12+ | Very viscous liquid. |
| Dibutyltindilaurate | 6 | ½ | Firm rubber. |
| Tetra-n-butyltin | 25 | 10 | Very viscous liquid. |
| Hexa-n-butylditin | 21 | 12 | Do. |
| Tetraphenyltin | 37 | 12+ | Do. |
| Hexaphenylditin | 22 | 12+ | Do. |

[1] Room temperature.

EXAMPLE 5

A mixture of 50 g. of Carwinate 125M (a technical grade of diphenylmethanediisocyanate containing about 11% 2,4'-isomer and 89% 4,4'-isomer), 90 g. of PPG1025 (a commercial 1000 M.W. polypropylene glycol), and 26 g. of TP440 was prepared at 30° C. and to which was then added 50 g. of Atomite (a commercial grade of powdered CaCO$_3$) and 10 g. of rutile, TiO$_2$. The resulting paste was degassed at 1 mm. Hg for 10 min. and then divided into portions of 22.6 g. Catalysts were mixed into the portions and then equal samples of each portion placed in a 150° C. heated metal mold having a cavity measuring ¼" x ¼" x 3/32" deep. After 60 sec. the cavity was emptied and the casting examined as follows:

| Catalyst | Appearance of casting | Pot life at R.T.[1] of unused portion (hrs.) |
|---|---|---|
| None | Liquid | 12+ |
| Triethylenediamine | do | ½ |
| Tetraphenyltin | Firm rubber | 12+ |
| Hexaphenylditin | do | 12+ |
| Tetrabenzyltin | do | 12+ |
| Hexa-n-butylditin | do | 12+ |

[1] Room temperature.

The above data clearly show that the organotin compounds of this invention can be effectively employed as latent catalysts in the preparation of polyurethane plastics. More specifically, it has been demonstrated that substantially increased pot life was achieved in conjunction with excellent gelation times at elevated temperature. Castings prepared in accordance with the present invention have an excellent appearance.

While particular embodiments of this invention are shown above, it will be understood that the invention is obviously subject to variations and modifications without departing from its broader aspects.

What is claimed is:

1. In the process of making a cured polymer by forming a mixture of an organic polyisocyanate and an active hydrogen-containing compound which is reactive therewith on curing to give a polymer having the repeating —NH—CO—O— in the polymer chain, and shaping and curing said mixture, the improvements which comprise (1) incorporating into said mixture a latent catalyst which is substantially ineffective to cure said mixture at room temperature, said latent catalyst being hexa-n-butylditin and (2) then heating said curable mixture to a temperature of at least 100° C. to activate said catalyst and cure said mixture.

2. In the process of making a cured polymer by forming a mixture of an organic polyisocyanate and an active hydrogen-containing compound which is reactive therewith on curing to give a polymer having the repeating —NH—CO—O— in the polymer chain, and shaping and curing said mixture, the improvements which comprise (1) incorporating into said mixture a latent catalyst which is substantially ineffective to cure said mixture at room temperature, said latent catalyst being hexaphenylditin and (2) then heating said curable mixture to a temperature of at least 100° C. to activate said catalyst and cure said mixure.

References Cited

UNITED STATES PATENTS

| 3,061,557 | 10/1962 | Hostettler et al. | 260—2.5 |
|---|---|---|---|
| 3,083,217 | 3/1963 | Sawyer et al. | 260—414 |
| 3,084,177 | 4/1963 | Hostettler et al. | 260—404.5 |
| 3,148,162 | 9/1964 | Gmitter et al. | 260—2.5 |
| 3,194,773 | 7/1965 | Hostettler | 260—2.5 |
| 2,912,414 | 11/1959 | Schultheis et al. | 260—75 |
| 2,932,621 | 4/1960 | Terry | 260—2.5 |
| 3,198,851 | 8/1965 | Hoy | 260—836 |
| 3,222,303 | 12/1965 | Hampson | 260—2.5 |

FOREIGN PATENTS 1,317,150   12/1962   France.

OTHER REFERENCES

Britain et al.: Journal of Applied Polymer Science, vol. 4, No. 11, pp. 207–211 (1960).

Hostettler et al.: Industrial & Engineering Chemistry, vol. 52, No. 7, pp. 609–610 (1960).

Chemical Reviews, vol. 60, pp. 14–15 (1960).

DONALD E. CZAJA, Primary Examiner

M. J. WELSH, Assistant Examiner

U.S. Cl. X.R.

117—132, 148; 260—2.5, 28, 37, 77.5